United States Patent [19]

Becker et al.

[11] Patent Number: 4,744,650
[45] Date of Patent: May 17, 1988

[54] HIGH RESOLUTION CINEPHOTOGRAPHICS SYSTEM

[75] Inventors: Roger J. Becker, Kettering; James M. Aulds, Oxford, both of Ohio

[73] Assignee: The United States of America as represented by the Secretary of the Air Force, Washington, D.C.

[21] Appl. No.: 879,726

[22] Filed: Jun. 27, 1986

[51] Int. Cl.⁴ .............................................. G03B 41/00
[52] U.S. Cl. ..................................................... 352/84
[58] Field of Search ......................................... 352/84

[56] References Cited

U.S. PATENT DOCUMENTS

| | | | |
|---|---|---|---|
| 3,074,170 | 1/1963 | Zabel et al. | 33/1 |
| 3,366,439 | 1/1968 | Buck et al. | 352/84 |
| 3,449,758 | 6/1969 | Lavine | 352/84 |
| 3,485,159 | 12/1969 | McCall | 95/36 |
| 3,587,424 | 6/1971 | Paine et al. | 352/84 |
| 3,594,060 | 7/1971 | Lowe | 352/84 |
| 3,643,568 | 2/1972 | Guillet et al. | 352/84 |
| 3,831,107 | 8/1974 | Karras | 331/94.5 |
| 4,339,775 | 7/1982 | Lemke et al. | 360/10 |

OTHER PUBLICATIONS

"High Speed Photography . . ." By R. E. Hendrix and P. H. Dugger, SPIE vol. 97, High Speed Photography, pp. 238–247 1976.

"A New High Speed Photographic Technique" Technology Trends, p. 32, vol.6, No. 8, Aug. 1972.

Application of a Copper Vapor Laser to High-Speed, High Resolution, Front-Lit Cinephotography of Solid Propellant Deflagration AIAA 85-1257, J. L. Laird et al., Jul. 8–10, Monteray, CA.

Primary Examiner—Monroe H. Hayes
Attorney, Agent, or Firm—Gerald B. Hollins; Donald J. Singer

[57] ABSTRACT

A propellant sample combustion apparatus employing a multiply optical ported pressure vessel for sample illumination, sample viewing, and sample burn face elevation is described. High-Speed motion picture filming using short-duration high-intensity laser provided optical illumination from a copper-vapor laser is employed. Details of the employed pressure vessel, a burn inhibiting coating for the propellant sample, a laser coherance spoiler, and a sample level maintaining closed-loop apparatus are also disclosed.

19 Claims, 6 Drawing Sheets

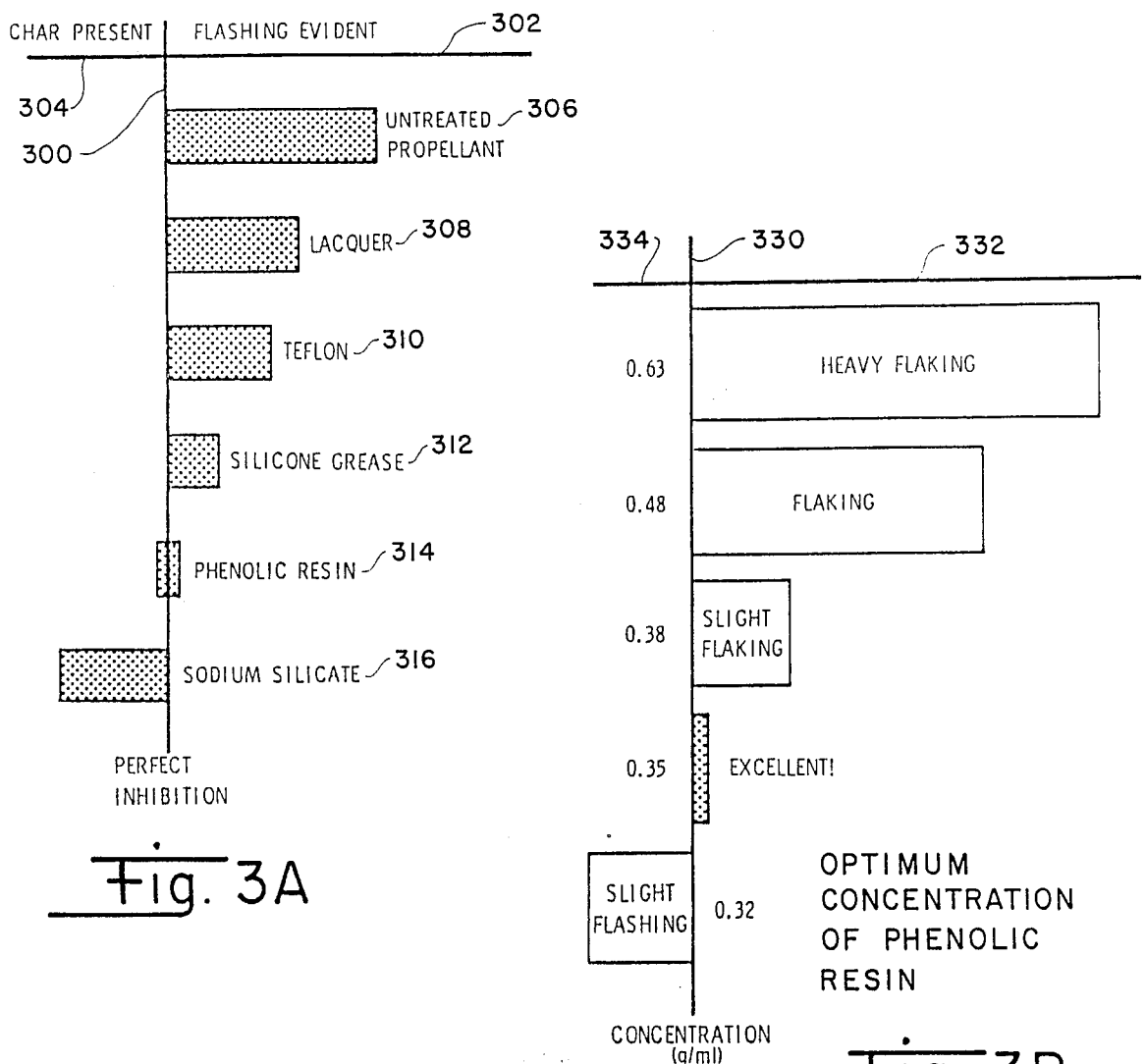
Fig. 3A
Fig. 3B
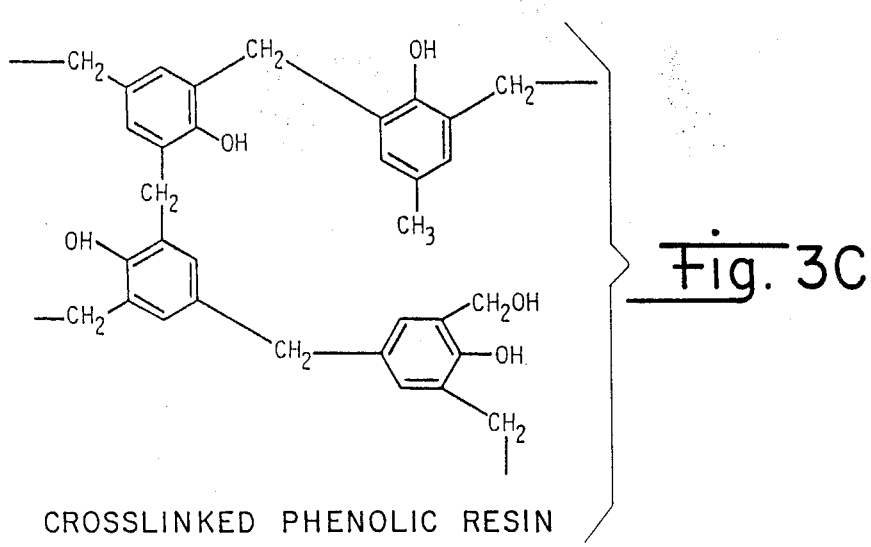
CROSSLINKED PHENOLIC RESIN
Fig. 3C

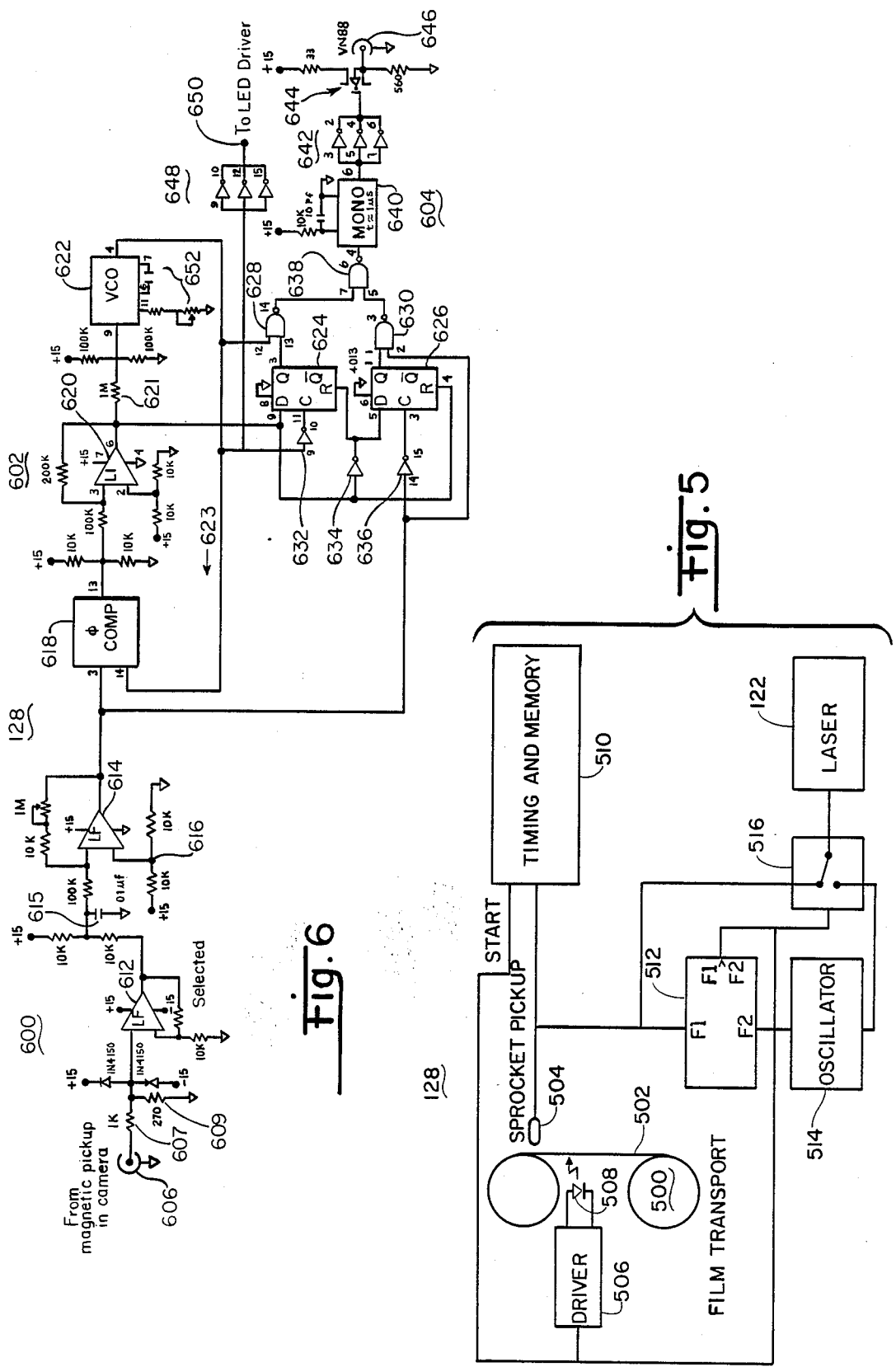

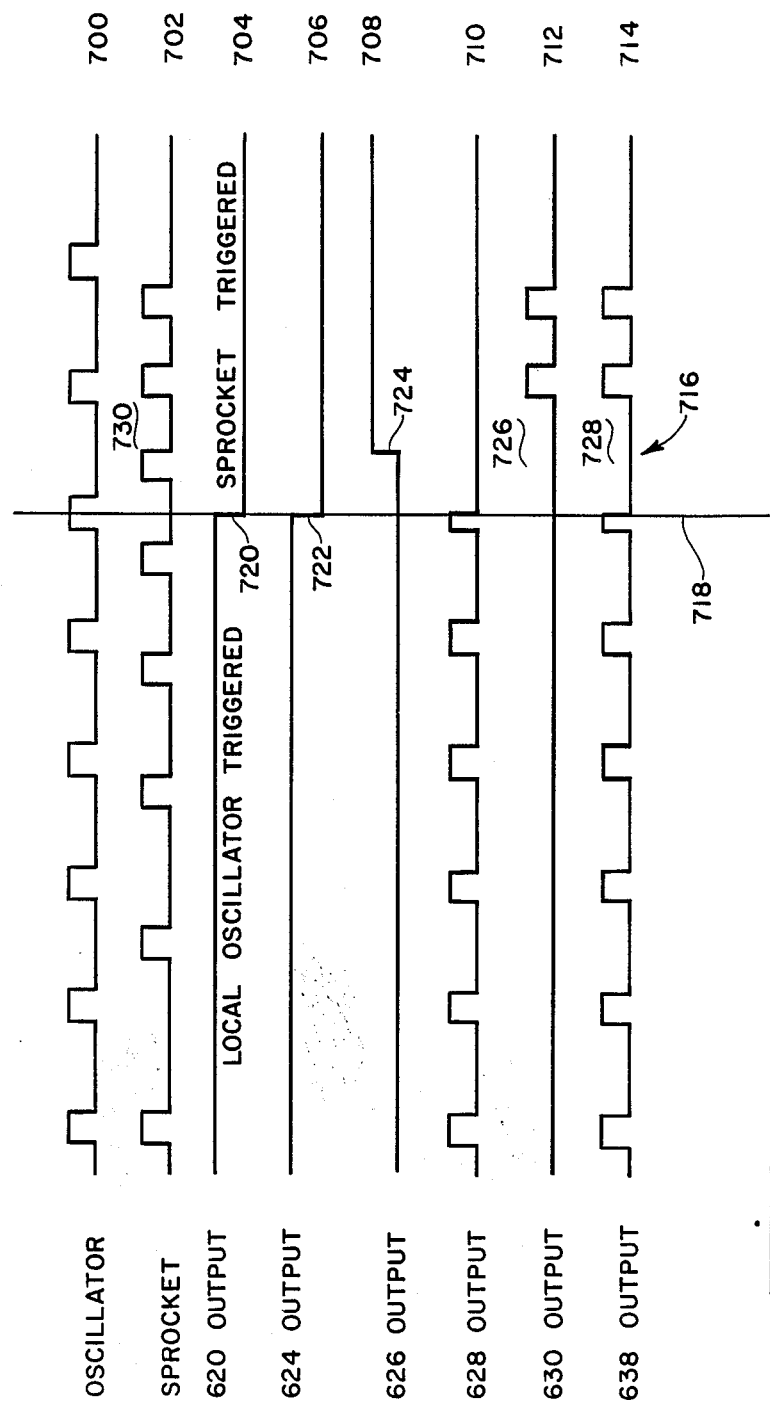

HIGH RESOLUTION CINEPHOTOGRAPHICS SYSTEM

CROSS-REFERENCE TO RELATED APPLICATIONS

This application relates to the copending applications "Laser Photography Pulse Synchronization Circuit", Ser. No. 06/879,717, "Proportional Drive Servo Controller with Array Position Detector", Ser. No. 06/879,718, "Optical Correlator for Analysis of Random Fields", Ser. No. 06/881,420, and "Chemical Inhibitor for Solid Propellants", Ser. No. 07/046,742, all except the latter of which are filed of even date herewith.

BACKGROUND OF THE INVENTION

The present invention relates to high-speed, high-resolution cinephotographic systems, and to cinephotographic systems for obtaining movies of combusting surface particle phenomena.

High speed movies are a useful tool in obtaining an understanding of the behavior of combusting surfaces, and especially in the study of solid propellant combustion surfaces. Solid propellants may generally be described as mixtures of particles of various types and sizes held together by a polymer binder. During combustion, these particles may interact with each other and with gases attending the combustion. In order to obtain a satisfactory understanding of the behavior of various propellant formulations for rocket motors, detailed photographic pictures of the combustion process of solid propellants are desirable; such pictures desirably utilize high resolution movies, including stereo or 3-D movies.

Existing methods for obtaining such high-speed movies are, however, severely limited in attainable resolution. Whereas typical solid propellant formulations may include particle sizes as small as two microns, existing movie technology can at best achieve 25 micron resolution—under special conditions, at low framing rates and in a limited field of view for a limited time. In addition to such resolution questions, it is significant to realize that previous systems for solid propellant photography have used flash lamp or xenon lamp illumination sources. Because these illumination sources have broadband, white-light spectral properties one cannot segregate the flash illuminating light preferentially from over the broadband natural incandescence of the flame at the propellant surface. Solid propellant surface photography has also been additionally limited in resolution—because the flame from individual particles is so bright that one cannot see particles located below the flame—particles which are often smaller than the flame itself. Furthermore, in previous photography systems, the achieved shutter times are in the range of one microsecond or more in time duration. With such shutter times and with camera frames at a high rate, blur will occur in the propellant particle image that is attributable to motion of the film in the camera.

To overcome this motion blur problem, conventional cinema photography magnifies the image, and thereby achieves a greatly reduced field of view. However, since the depth of field in a photographic system decreases with the square of the employed magnification, these conventional photography systems become extremely limited in depth of field. Therefore, high-resolution propellant burn face movies using conventional cinephotography techniques have such a small depth of field that the burn face is in usable focus over only a very limited region of its surface and for a few frames in the course of an extended fixed focused movie sequence.

In contrast with these difficulties, the present system affords a 25 nanosecond effective shutter time and thereby affords motion freezing illumination. The present system is also of a high intensity and monochromatic nature. Additionally a photo-diode array servopositioner in the present system enables satisfactory focused images to be obtained over a whole surface of the propellant sample and throughout the course of an entire movie sequence. The described system can therefore obtain 15-micron resolution at framing rates of over 7 kHz.

The patent art includes several examples of combustion and explosion study apparatus using both direct viewing and photographic tecniques, and including both stereoptic and nonstereoptic imaging. Included in this patent art is the patent of Norman R. Zabel el al, U.S. Pat. No. 3,074,170, which concerns an arrangement for photographing explosion events through the use of high-speed photography, illumination by argon bomb light sources, and a rotating mirror framing arrangement.

The patent art also includes the patent of W. E. Buck et al, U.S. Pat. No. 3,366,439, which concerns a laser illumination and shuttering arrangement for high-speed photography. In the Buck et al patent, an argon gas pulsed laser is used in conjunction with a rotating mirror and a slitted stop plate for illuminating and photographing workpiece objects. The slitted stop plate in the Buck et al invention provides improved rise and fall times for the workpiece illumination. The Buck et al apparatus also contemplates photographic recording of a self-luminous event and employs monochromatic laser illumination with filters for suppressing the non-laser illumination.

The patent of G. H. McCall, U.S. Pat. No. 3,485,159, also discloses the use of a laser in photographing luminous gas surrounded objects. In the McCall apparatus a Kerr cell shutter and a Q-switched ruby laser are used to achieve exposure times in the 10 nanosecond range with frame separations as short as 5 nanoseconds.

The patent of Thomas W. Karras, U.S. Pat. No. 3,831,107 teaches the use of copper-vapor, quenched by cesium vapor in a laser.

The patent art has not, however, provided the combination of a high-speed well-focused motion picture system for rocket propellant samples, a system which employs a copper-vapor laser short pulse monochromatic illumination of the propellant sample burn face in a controlled atmosphere environment.

SUMMARY OF THE INVENTION

The present invention provides a high speed, high resolution cinephotographic system for making movies of combusting surfaces, with special application to studies of solid propellant deflagration at elevated ambient pressure. Principal elements of the system include a copper-vapor laser, an optical spoiler, a high pressure windowed combustion chamber, a servopositioner for the propellant sample under examination and a source of illumination for the positioner. The system is capable of resolutions in the range of 20 microns at framing rates near 7000 Hz with combustion gas pressures of 500 psi or more.

It is therefore a principal object of the invention to provide an improved high speed, high resolution cinephotographic system.

It is a further object of the invention to provide a cinephotographic system for combustion studies.

It is a further object of the invention to provide a high speed, high resolution system for photographing solid propellant combustion.

It is another object of the invention to provide a high speed, high resolution system which realizes the benefits of illumination by a pulsed monochromatic metal vapor laser such as a copper-vapor laser.

It is another object of the invention to provide a pressure vessel apparatus wherein the study of propellant sample combustion can be conveniently and effectively achieved.

It is another object of the invention to provide an effective burning inhibitor for treating the sides of a propellant sample and confining sample combustion to a sample end surface region.

These and other objects are achieved by a motion picture photography apparatus for recording burn face phenomena of a rocket propellant sample including: a pressure vessel having a plurality of optical apertures, a pressure sealable fuel sample aperture and gaseous purge apertures disposed therein, a rocket propellant sample partially received via the fuel sample aperture within the pressure vessel, a high-speed motion picture camera having a film transport and an optical system receptive of burn face optical images via the pressure vessel optical apertures, pulsed laser monochromatic light source apparatus for illuminating the propellant sample burn face via the optical apertures and in the presence of incandescent propellant combustion gases, optical energy pulses from the laser being of short, motion freezing duration with respect to film motion in the camera film transport, closed-loop sample feeding apparatus connected with a portion of the propellant sample external of said pressure vessel for maintaining the burn face within depth of field focus of the camera optical system during sample burning consumption, and synchronizing apparatus responsive to film movement velocity in the film transport for triggering generation of the laser optical output pulses in frame synchronization with the film movement.

These and other objects of the invention will become apparent as the detailed description of certain representative embodiments thereof proceeds.

DESCRIPTION OF THE DRAWINGS

The present invention will be clearly understood from the following detailed description of a representative embodiment thereof read in conjunction with the accompanying drawings wherein:

FIG. 3 including the views 3A, 3B and 3C shows details of propellant sample burn inhibitor coatings.

FIGS. 5-7 show details of apparatus for triggering the laser.

DETAILED DESCRIPTION

Figure 1:
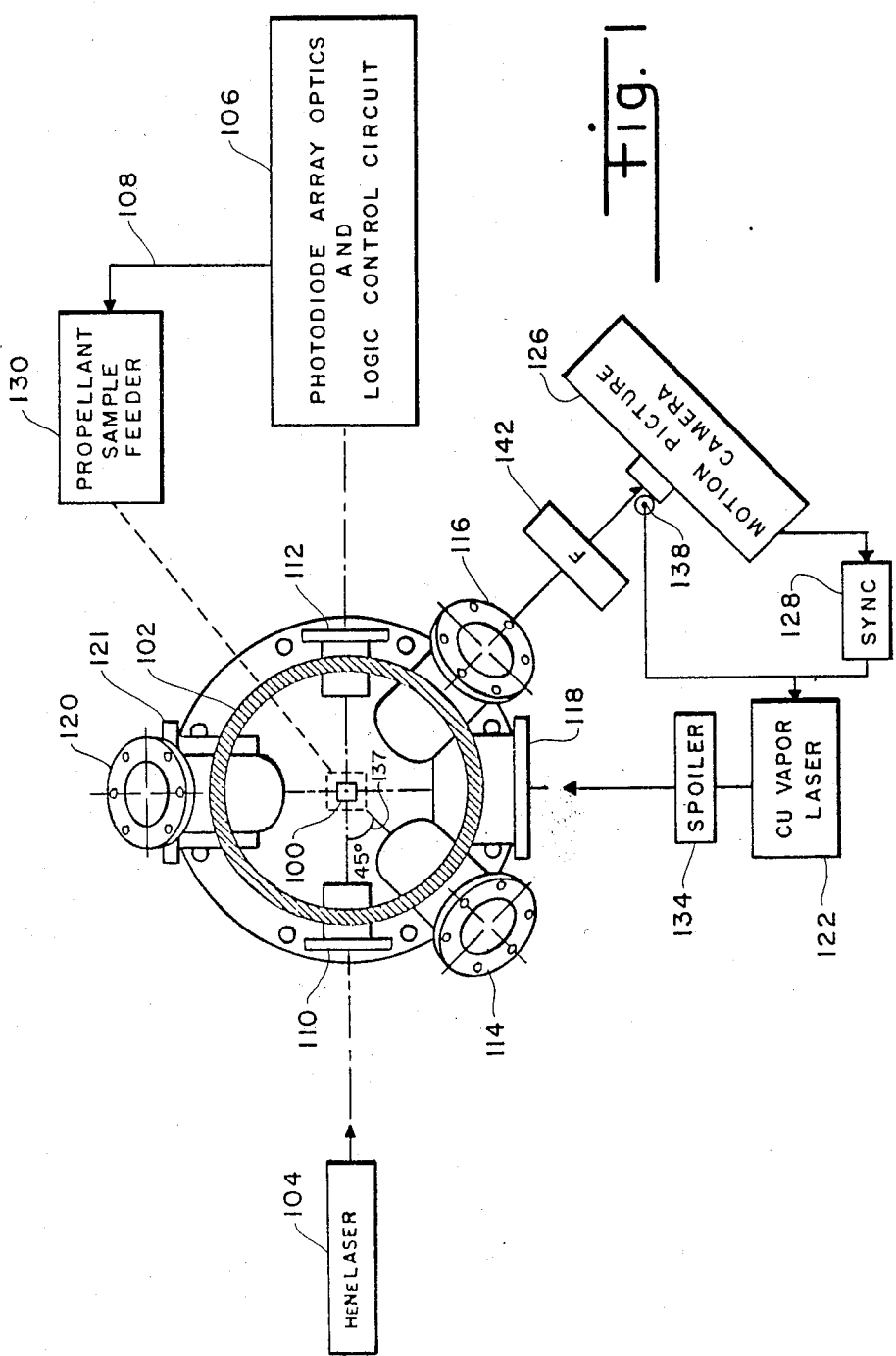
FIG. 1 is a combined combustion chamber top view and block diagram showing representative component parts comprising the invention.

Referring now to FIG. 1 of the drawings, shown therein is a schematic of a system for photographing combustion according to the invention. The FIG. 1 system includes a copper-vapor laser 122 for illuminating a propellant sample burn surface, and a windowed pressure chamber 102 which enables the use of a high pressure burning environment during photography. The pressure chamber 102 also minimizes problems with burn smoke while also allowing flexible optical access to the sample burn face. The FIG. 1 apparatus also includes an illuminator or optical spoiler 134 which reduces speckle from the coherent laser illumination source 122 and a servopositioner sample feeder 130 which uses a photo-diode array and logic control circuit 106 to achieve sample burn face position control. The FIG. 1 sytem enables 15 micron resolution movies of the surface of a burning propellant sample strand over long periods of time with framing rates in excess of 7000 frames per second, and with suppression of the incandescence attending propellant burning.

The FIG. 1 disclosed apparatus is based on the copper-vapor laser. The copper-vapor laser has two lasing or output spectrum wavelengths, one at 510 nm and one at 585 nm. User of the 510 nm spectral line, with 1.4 mJ pulse energy gives an effective monochromatic light source. The copper-vapor laser is capable of repetition rates of 7000 pulses per second and 30 ns optical energy pulses. The 1.4 millijoule per pulse energy output of the preferred copper-vapor laser is therefore effectively and desirably monochromatic at a spectral frequency of 510 nanometers. These characteristics combine therefore to make the copper-vapor laser a desirable illuminating source for high-speed, front-lit combustion photography.

Figure 2:
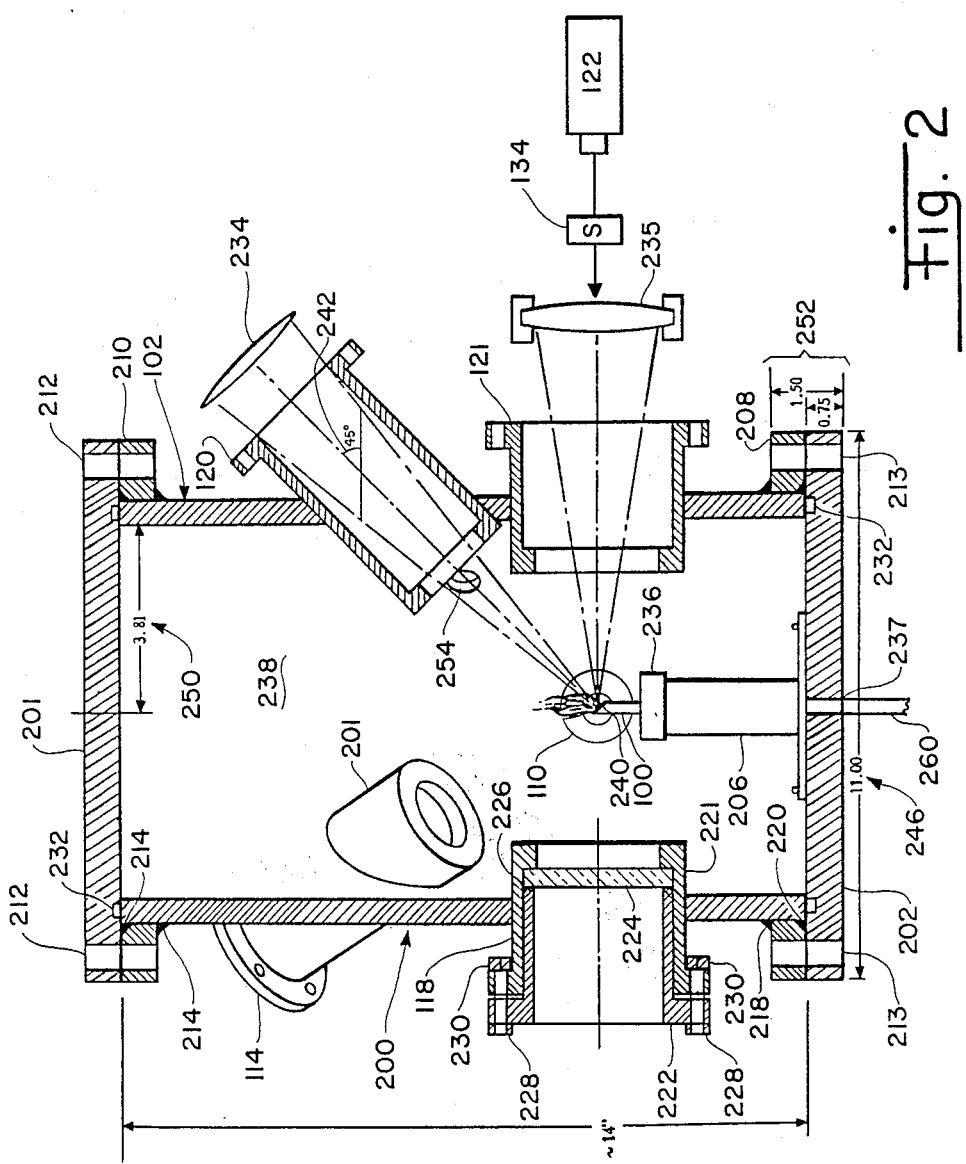
FIG. 2 is a side view of a representative chamber for photographing combustion according to the invention.

A propellant sample 100 is shown partially within and partially external of the pressure vessel 102 in the related but differing embodiment views of FIG. 1 and FIG. 2 of the drawings drawings which will be considered simultaneously herein as needed. The propellant sample is preferably made to have dimensions near one-fourth inch on each edge, a long slender length and a burn face end that is beveled at an angle of forty-five degrees. A plurality of apertures in the pressure vessel allow observation of this burn face by other apparatus of the system.

The FIG. 1 system also includes a motion picture camera 126 or a pair of motion picture cameras 124 and 126 preferably of the high-speed shutterless variety. Such cameras may be of the rotating drum variety of camera, one version of which is manufactured by Fastex Corporation. In FIG. 1 the camera is preferably disposed at a distance near one meter from the sample burn face. Light for exposing film transported in the camera 126 is provided by the laser 122, the copper-vapor laser described above. The illuminator or spoiler 134, which is described in greater detail below, removes the speckle characteristic of light energy emanating from the laser 122—speckle produced by the laser coherence. Synchronization between the laser 122 and the camera 126 is provided by the synchronizing circuit 128 described in greater detail below. Briefly stated, the synchronizing circuit 128 triggers the emission of laser optical energy pulses upon sensing proper positioning of film by a sprocket member in the camera 126. The triggered laser output pulses provide effective shuttering for the camera 126. The synchronizing circuit 128 also energizes a source of illumination 138, such as a light emitting diode, which can be imaged onto the film of one or both of the cameras 124 and 126 as a time or position reference marker.

Camera Considerations

In the camera system shown in FIG. 1 the camera can, of course, be positioned to use a different one of the pressure vessel optical apertures 110, 112, 114, 116, 117, 118, 120 and 121 as needed.

Optical filters suitable for use at 140 and 142 in FIG. 1 may be of the interference/bandpass type such as are manufactured by Pomfret Research Optics Corporation. A filter providing an optical passband between 500 nm and 520 nm is preferred.

The camera lenses may be 50 mm Nikkor f/4 microlenses which are rated at a resolution of 100 line pairs/mm and tested on 6 µm high contrast images.

High resolution at unity magnification is achieved in the FIG. 1 system by the use of 1.4 mJ of illumination energy per pulse together with a fine-grain slow film. Film such as Eastman Kodak Shellburst 2476 film (150 line pairs/mm) or Technical Pan 2415 film (400 line pairs/mm) or Kodak RAR 2496 film (50 line pairs/mm) is preferred. Film developers such as Kodak D-19 and D-76, along with negative movies are also preferred. A suitable choice of line filters 140 and 142 for the cameras 124 and 126, together with the slow speed of the film and the monochromaticity of the laser illumination, enables discrimination against flame brightness to any desired degree in the FIG. 1 and FIG. 2 system. This approach is desirable for both aluminized and pure aluminum perchlorate propellants. Since a sufficient quantity of light is provided to expose fine-grain film and employ low magnification, the entire ¼-inch propellant sample strand surface can be received in the camera field of view. Motion blur at 7 kHz framing rates and unity magnification is on the order of 2.5 microns as the result of the 25 ns duration of the laser pulses. The short illumination pulse duration is also helpful in overcoming flame turbulence effects.

To be more specific, motion pictures with the FIG. 1 apparatus are preferably taken at a magnification M of 1 or 0.5. In choosing a desired magnification, a trade-off must be made between maximizing resolution and obtaining a useful depth-of-field, z, and field of view. Considering these factors briefly, the ratio of image contrast to the contrast of the object is referred to as the modulation transfer function (MTF) of the system. Usually, a system MTF will be the product of MTFs for the various elements of the camera optics and the film. In general, a superior MTF is achieved if monochromatic light is used rather than white light. The minimum size of a feature, X, which can be resolved by a camera and film combination depends on the spatial cutoff frequency, $k_c$, of the MTF of the system. Typically, a spatial frequency, $k_1$, lower than $k_c$ will apply, since the quality of the image will degrade steadily as $k_1$ increases, especially with low contrast object fields. Often $k_1$ is taken to be about $k_c/4$. The required relation for minimum resolvable feature, X, of a system in terms of $k_1$ and magnification M is:

$$X = 1/Mk_1 \quad (7)$$

Therefore it is desirable to maximize $k_1$. Unfortunately however, the depth of field, z, obeys the relation $$z = [1/(Mk_1)^2][1/\lambda] \quad (8)$$

with respect to the light wavelength λ. Therefore, high-resolution movies with a practical depth-of-field must be made at low magnification.

Additionally, however, for a fixed film frame size, the field of view also decreases as $1/M^2$. Therefore X and z are effectively coupled, with $$z = X^2/\lambda \quad (9)$$

This relationship for depth of field places severe limits on a camera optical system as X approaches λ, that is, as the minimum resolvable feature approaches the light wavelength, and makes it desirable for a system of the FIG. 1 type to include some arrangement for accommodating limited camera optics depth of field.

Propellant Sample Feed

Maintenance of a propellant sample burn face within the narrow confines of a practical optical system depth of field, that is, maintenance of a propellant burn face within a 100 micrometer range of position during progression of a propellant burn in the FIG. 1 and FIG. 2 apparatus is necessary, as is demonstrated by the above mathematical relations, in order to maintain usable focus conditions of the camera optics. The blocks 104, 106 and 130 in the FIG. 1 apparatus, the optical apertures 110 and 112 including a functional perspective of these apertures shown in FIG. 2 of the drawings are concerned with the dynamic maintenance of a propellant sample burn face within the camera optics depth of field range. This burn face positioning preferably is accomplished by illuminating a vertically disposed multiple element diode array with a second FIG. 1 laser, the laser 104. In this arrangement the number of non-laser illuminated diode elements directly indicates the length of the propellant sample 100. The propellant sample feeder 130 in FIG. 1 is therefore made to be responsive to the number of eclipsed sensor elements in the photodiode array in the block 106, as is communicated along the path 108. By way of this optical sensing of the propellant sample burn face position, closed loop dynamic control of the sample burn face position within the depth of field of the camera optics can be accurately maintained. Additional details of the burn face positioning apparatus are disclosed in the above identified co-pending application "Proportional Drive Servo Controller with Arrayed Position Detector", Ser. No. 06/879,718, which is hereby incorporated herein by reference.

Pressure Vessel

The conduct of propellant burn face photographic studies under controlled conditions of ambient pressure, gaseous reactants, and combustion products disposal necessitates the use of a closed pressure vessel chamber, such as the pressure vessel 102, wherein the propellant sample 100 is received for burning. A pressure vessel suitable for this purpose comprises the right circular cylinder member 200 shown in FIG. 2, together with a pair of circular planar closure members 201 and 202 located at opposite ends of the circular cylinder member 200. The closure members 201 and 202 are attachable to the cylinder 200 in FIG. 2 by way of a pair of annular rings 208 and 210 welded to the exterior surface of the cylinder 200 as shown at 214, 218 and 220. Closure member attachment may use bolts, not shown, that are received in an array of circumferentially disposed holes 212 and 213 located in the closure members 201 and 202, and in the associated annular rings 208 and 210. Suitable gross dimensions for the pressure vessel 102 are shown at 246, 248, 250 and 252 in FIG. 2 of the drawings; dimensions for the smaller detailed parts of the pressure vessel 102 can be arranged by persons skilled in the art in consideration of these gross dimensions. The pressure vessel is preferably made of stainless steel in deference to the corrosive nature of the products of combustion and is of propellant welded, stress-relieved construction. The inside of the chamber is coated with an inert substance during use to prevent attack on the welds by the hot hydrochloric acid vapor formed during combustion.

The pressure vessel 102 can be observed in both FIG. 1 and FIG. 2 to include a plurality of optical apertures 110, 112, 114, 116, 117, 118, 120 and 121 by which observation of the propellant sample 100 for burn face phenomena study, burn face positioning, and human eye viewing may be achieved. Three of the optical apertures, the apertures 114, 116 and 117 are preferably disposed at oblique angles, as indicated at 137 and 242 in FIGS. 1 and 2, with respect to the central axes of the pressure vessel 102.

Since the internal region 238 of the pressure vessel 102 may be exposed to operating pressures in the range of 0 to 600 pounds per square inch in the course of propellant sample burn studies, it is desirable to seal the interface of the closure members 201 and 202 with the right circular cylinder member 200 by way of gas-tight resilient seals—seals such as the rectangular cross-sectioned O-rings indicated at 232 in FIG. 2. A gas-tight sealing arrangement is also provided at each of the optical apertures 110, 112, 114, 116, 117, 118, 120, and 121 in the pressure vessel 102.

An arrangement suitable for sealing each of the optical apertures is shown in detail for the aperture 118 in FIG. 2, this arrangement can be duplicated for the remaining apertures of the FIG. 2 pressure vessel, but is omitted for drawing clarity and simplicity. Sealing of the optical pressure 118 is accomplished through use of a thick transparent window 224 that is received in reentrant fashion within the cavity 221 of the aperture 118. The transparent window 224 may be fabricated of glass, quartz, or one of the clear plastic materials that are known in the art. Sealing of the transparent window 224 against pressure leaks from the internal region 238 of the vessel 102 may be achieved with the use of an O-ring type of seal 226. The O-ring 226 and the transparent window 224 are held captured and sealed by the flanged cylindrical sleeve 222 received within the body 221 of the optical aperture 118 and retained in captured position therein by an array of bolts and nuts 228 and 230. The thickness of the transparent window 224 can, of course, be selected in accordance with the expected working pressures within the pressure vessel 102 in view of the selected size of the optical apertures, the type of window material used, and the thicknesses of the cylinder member 200 and the closure members 201 and 202.

The propellant sample 100 received within the pressure vessel 102 is of a square cross-section, a cross-section measuring about ¼inch on each side, and is provided with the forty-five degree beveled burn face indicated at 240 in FIG. 2. The beveled burn face provides for optimum viewing by a camera aligned with the camera identified optical aperture 120, as shown in FIG. 2 of the drawings.

FIG. 1 of the drawings shows use of the optical aperture 116 by the camera 126 and use of the optical aperture 118 by the laser 122. In contrast, however, FIG. 2 shows use of the aperture 120 by the camera and the aperture 121 by the laser 122. FIG. 2 is the preferred of these arrangements and achieves the desired front lit viewing of the sample. The FIG. 1 representation is disclosed herein for the sake of drawing clarity, since it avoids a need to superimpose the laser and camera elements and their pressure vessel apertures in a top view drawing.

The propellant sample 100 is received within the pressure vessel 102 by way of a guide tube 206 and a tube lid 236 that are capable of freely admitting the sample 100. Sealing of the opening between the drive rod 260 and the flange 202 may be accomplished by resilient seal members.

The guide tube 206 and pressure fitting 236 are mounted on a circular flange 204 that may be attached to the lower closure member by screws, rivets or other attachment arrangements.

One of the ports used for admitting pressurizing air or other combustion reactant, and for removing combustion products from the pressure vessel 102 is shown at 254 in FIG. 2.

Since high-resolution motion pictures demand extensive uncluttered optical access, the prevention of window fouling represents a special challenge, particularly for front-lit movies of the type represented contemplated in FIGS. 1 and 2. In front-lit movies, the camera must look down on a burning surface. The FIG. 2 illustrated pressure presence of a large number of reentrant viewing ports, a positive flow of cleaning and purging gases and optics as fast as F/1.3 to F/2.0 is desirable in this regard in the FIG. 1 and FIG. 2 illustrated pressure vessel. The large size of the pressure vessel 102, preferably a size of 8 inches in diameter by 14 inches in height, also facilitates clean window or aperture maintenance in the vessel and its interior portions and minimizes light attenuation from combustion smoke. The pressure vessel described enables burn surface studies with turn-around times between filmings as short as 30 minutes.

Illuminator-Spoiler

Figure 4:
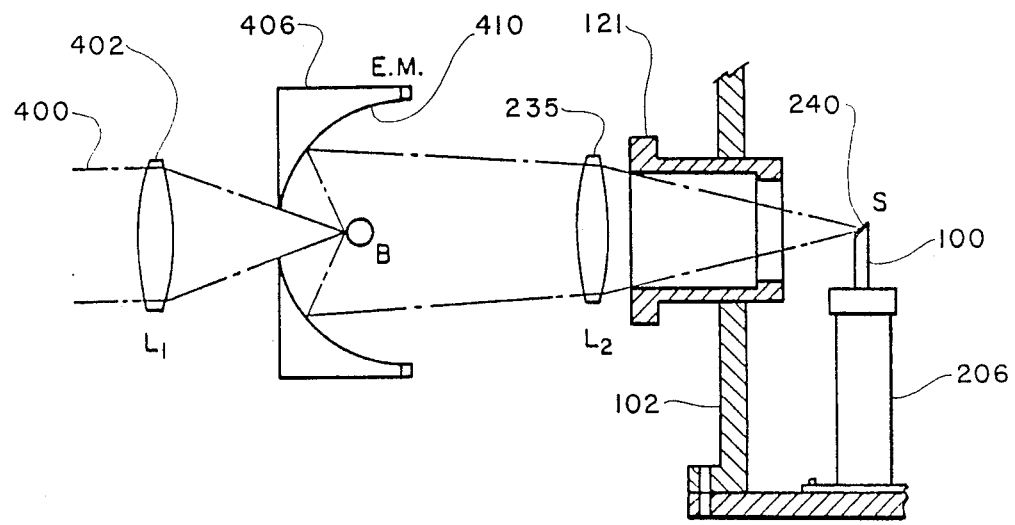
FIG. 4 shows details of an optical spoiler speckle reducing portion of the invention.

Optical energy from the copper-vapor laser 122, because of the attained high degree of coherence in such lasers, provides a degree of illumination speckle which is undesirable for high-speed movie illumination purposes. An apparatus capable of reducing the speckle component of this laser illumination is shown in FIG. 4 of the drawings. The FIG. 4 apparatus, a coherence spoiler, includes a high-reflectivity diffuse scattering sphere 404 which is located at one of the object focus points of a wide angle ellipsoidal mirror 406. The scattering sphere 404 may be fabricated of materials such as stainless steel and may be coated with a highreflectivity diffusing medium such as magnesium oxide powder. In operation, the light scattered by the rough reflective surface of the sphere 404 is collected by the ellipsoidal mirror 406 and focused on the burn face 240 of the propellant sample 100 by way of the lens 235 or other optical elements. Optical energy received from the laser 122 is indicated at 400 in FIG. 4, and is focused on the surface of the sphere 404 by the lens 402. The sphere 404 in the FIG. 4 apparatus may, for example, have a radius of one-fourth inch; and the ellipsoidal mirror 406 a diameter of three inches and a focal length of two and one-half inches. The magnesium oxide powder coating on the sphere 404 may be deposited on the sphere 404 by way of inserting the sphere 404 into the smoke of a burning magnesium wire. The spoiler apparatus shown in FIG. 4 is capable of eliminating a large part of the speckle observed from a helium-neon laser, a severe test of spoiler effectiveness.

Synchronizing Circuit

The FIG. 1 apparatus permits illumination of the propellant sample burn face by a monochromatic light source, the copper-vapor laser 122, using pulses of high intensity optical energy that are brief in time duration. By way of the spoiler 134, these pulses of optical energy are also non-coherent in nature. With this controlled illumination, disturbances on the propellant burn face become viewable as real-time events on film that is moving through the camera 126. In such a photographic system, the camera 126 does not include mechanical shutter mechanisms of the type normally employed to allow movement of film between exposure frames. In lieu of such a shutter, short duration light pulses from the laser 122 provide the most significant light viewed by the camera 126 (considering the filter 142) and by way of being of this short time duration effectively perform the function of a camera shutter. In view of this use of short duration laser optical energy pulses as a camera shutter, a need arises to synchronize the occurrence of laser energy pulses with film movement in the camera 126. Such synchronization is provided by the apparatus represented at 128 in FIG. 1, and shown in greater detail in FIGS. 5–7 of the drawings. The synchronization apparatus 128 in FIG. 1 also can be used to drive an optical source 138 which is used to exposed reference marks on the film in the camera 126, as is explained in greater detail in connection with the LED embodiment 508 of this source shown in FIG. 5.

FIG. 5 of the drawings shows a block diagram of a synchronization apparatus usable at 128 in FIG. 1. The FIG. 5 apparatus appends to a film transport 500 which moves a web of exposable photographic film 502 at a suitable velocity before a camera optical system which is not shown. Motion of the film 502 within the transport 500 is, of course, subject to the usual real-world characteristics of finite acceleration and deceleration times, movement jitter or variation and relatively short film length. Notwithstanding these real-world characteristics, it is desirable for the light pulse provided by the laser 122 to occur in identical film position locations for each exposure frame of the film, since variations between laser pulse occurrence and film location will provide exposures which are not matched to the center of the camera frame and will therefore be impossible to interpret when the exposed film is played back as a motion picture.

In addition, the thermal characteristic of the laser 122 which in the present apparatus is preferably a copper-vapor laser, dictate that the laser must be operated for some time prior to making a film exposure and be continued in operation during camera unloading and reloading (when additional film exposure is to be accomplished) in order that predictable and stable levels of optical energy be delivered. This combination of camera and laser characteristics is accommodated in the present apparatus by way of triggering the laser 122 from a selected one of two possible triggering sources.

The first of these triggering sources, the timing and memory apparatus 510, is actuated by signals derived from a signal source such as the sprocket pickup transducer 504 that is associated with the film transport 500; the second of these trigger sources is the electronic oscillator circuit 514. Switching between these two sources of laser triggering pulses is accomplished by an electronic switching apparatus 516 that is controlled by a flip-flop multivibrator circuit arrangement 512.

In addition to the principal concept of synchronizing laser operation with movement of film in the transport 500, it is found desirable in interpretation of the moving pictures provided by the FIG. 1 and FIG. 2 apparatus to include a visual marker provided by the light source 508 which was shown at 138 in FIG. 1 and which may be a light emitting diode, for example, that is driven by the driver 506.

FIG. 6 of the drawings is an electrical schematic diagram showing details of an embodiment of the FIG. 5 synchronization apparatus. The FIG. 6 circuitry includes generally an input circuit portion 600, an oscillator and oscillator control portion 602, and a selecting and driving portion 604. In the input circuit portion 600, a signal from the magnetic transducer sprocket pickup 504 is received at the terminal 606 and conducted by way of the divider resistors 607 and 609 to the positive input terminal of the operational amplifier 612. A pair of electrical diodes 608 and 610 connected to ±15 volt power sources limit the amount of signal voltage swing that can occur at the input terminal of the amplifier 612.

The output of the operational amplifier 612 is connected to a second operational amplifier 614 which is arranged to act as a comparator circuit, that is, to provide a binary output signal of one predetermined level when signal received from the amplifier 612 exceeds the reference signal generated at the node 616. The higher frequency response or bandpass of the comparator circuit 614 is limited by the capacitor 615 to attenuate transient noise signals present in the output of amplifier 612. The binary output of the comparator 314 comprises a signal responsive to acceleration, deceleration, and jitter speed variations of the film 502 in the transport 500. This signal therefore comprises a major component of the triggering signal desired for the laser 122 in operating the FIG. 1 apparatus.

Another component of the signal desired for operating the laser 122 originates in the oscillator and oscillator control portion 602 of the FIG. 6 apparatus. The oscillator and oscillator control portion 602 includes a voltage controlled oscillator 622 which is frequency responsive to the output of a second comparator circuit 620 that is in turn driven by a phase comparator circuit 618. As is additionally described below, the voltage controlled oscillator 622 provides a local oscillator output signal which is shifted in frequency by the binary signals appearing at the output of the first comparator 614 during operation of the film transport 600.

In the free-running mode of operation, a feedback signal from the voltage controlled oscillator output is communicated along the path 623 to the input of the phase comparator circuit 618 for comparison with the signals arriving from the binary comparator circuit 614. In the absence of signals from the comparator circuit 614, the voltage controlled oscillator 622 and the resistor networks attending the circuits 618 and 620 are so arranged that the voltage controlled oscillator 622 operates in a free-running mode wherein the frequency generated is somewhat lower than the frequency expected during triggering by the transducer 504. The resistor 621 is principally effective in providing this higher output frequency from the oscillator 622 in the absence of pulses from the comparator circuit 614.

It is found convenient to embody the phase comparator circuit 618 and the voltage controlled oscillator 622 using a commercially available integrated circuit of the type identified as a CD4046A or an equivalent thereof. Circuits of this type are manufactured by RCA Corporation, and by a number of other integrated circuit manufacturers. The RCA version of this circuit is known variously as a CD4046AD, CD4046AK, CD4046AE, CD4046AH, depending on the type of packaging employed, and is a COS/MOS micropower phase-locked loop device. This circuit is described in a technical data sheet for the CD4046 circuits published by RCA Corporation and identified as file number 637 dated May 1973.

Additional information regarding phase-locked-loop circuits, especially the RCA CD4046 circuit, is to be found in an RCA Corporation application note identified as ICAN-6101 authored by David K. Morgan, and dated November 1973, and published by RCA Corporation. Additional information regarding phase-locked techniques is to be found in the book *Phase Lock Techniques*, by F. Gardner, published in 1966 by John Wiley and Sons of New York, NY and in the article "Miniaturized RC Filters Using Phase-Locked-Loop" published by G. F. Moschytz, and appearing in the Bell System Technical Journal of May 1965.

The output signal from the voltage controlled oscillator 622 in FIG. 6 therefore assumes one of two possible operating frequency modes. In these operating modes, the voltage controlled oscillator 622 has an output frequency determined by the connected electrical components, that is, by the network 652 and the two 100K resistors in the voltage divider at the input terminal #9—with the 1 Megohm input terminal connected resistor adding current for frequency change as determined by the output of compartor 620. The lower oscillator frequency is selected to be lower than the 5 kHz sprocket determined operating frequency of the film transport pulses by some predetermined amount such as 200 Hz in order that a band of frequency hysteresis be established and frequency hunting or indecision in the selecting and driving portion 604 of the FIG. 6 apparatus be avoided.

More specifically, if the frequency of the sprocket pickup signal is lower than the frequency of the local oscillator, then the local oscillator provides the higher frequency ($F_H$) of its two output signals. If, however, the sprocket frequency is higher than the local oscillator frequency, then the local oscillator shifts to a lower output frequendy ($F_L$). This frequency shift hysteresis eliminates a tendency for the system to shift back and forth between sprocket pickup and local oscillator signals when the two frequencies are nearly equal or in response to noise transients. The laser, in this arrangement, is triggered by the higher frequency source, therefore with no film motion, the laser is triggered from the local oscillator at $F_H$ and when the sprocket pickup frequency is greater than $F_H$ the local oscillator is frequency shifted to $F_L$ and the laser is triggered from the sprocket pickup. When the camera has slowed toward shutdown and the sprocket frequency is less than $F_L$, the current local oscillator frequency, the local oscillator frequency is shifted back to $F_H$ and the laser is triggered from the local oscillator.

Switching between the supplying of laser trigger pulses from the sprocket pickup 504 and from the voltage controlled oscillator 622 occurs in the logic gates 628, 630 and 638, depending upon the output signals from the two flip-flop multivibrators 624 and 626. The flip-flop multivibrators 624 and 626 provide short-term memory storage and are actuated by the pulse output of the voltage controlled oscillator 622, the pulse output of the second comparator 620, and the pulse output of the first comparator 614. The operation of these two flip-flop multivibrators is according to the waveforms shown in FIG. 7 of the drawings.

In FIG. 4 a typical oscillator output waveform is shown at 700 and a typical camera startup waveform is shown at 702; the pulses of the sprocket pickup signal can be observed to decrease in spacing from left to right in the waveform 702. The output of the comparator 620 is shown at 704 in FIG. 7 and the transition in this output which results from the sprocket pickup frequency reaching the local oscillator frequency is shown at 720. The Q outputs of the flip-flop multivibrators 624 and 626 are shown at 706 and 708 in FIG. 7, while the ANDing of these multivibrators with oscillator and sprocket pickup signals in the logic gates 628 and 630 is shown at 710 and 712. The "OR"ed output of the gates 628 and 630 is shown at 710 in FIG. 7. This "OR"ed output from the gate 638 is the laser trigger signal, except for pulse duration—a characteristic controlled in the monostable multivibrator 640 to be about 1 microsecond in duration.

Generally the flip-flop multivibrators 624 and 626 change state when the laser triggering switches between local oscillator and sprocket pickup sources and vice versa. When the camera is started the frequency of the sprocket pickup ($F_p$) is, as shown at 700 and 702 in FIG. 4 lower than that of the local oscillator ($F_o$) and the laser is therefore triggered from the local oscillator. When the sprocket frequency becomes greater than the local oscillator frequency, then the output of the comparator 620 changes from high to low as shown at 720 in FIG. 7. This transition resets the flip-flop multivibrator 624 and thereby terminates the flow of pulses from the gate 628.

During the following interval the laser is not triggered—as is shown at 716 in FIG. 7. This absence of triggering prevents undesirable transient triggering of the laser and a resulting lockup of the laser trigger circuit.

The high to low transition of the output from comparator 620 also enables a setting of the flip-flop multivibrator 626, an event which occurs on the falling edge of the next sprocket pickup pulse as shown at 724 and 730 in FIG. 7. Once the multivibrator 626 is set the gate 630 is enabled and sprocket pulses being triggering the laser as shown at 726 and 728 in FIG. 7.

The switching between electrical component determined voltage controlled oscillator signals (local oscillator signals) for driving the laser 122 therefore occurs in dependence upon the frequency of pulses originating with the film transport 500. After film motion commences, once the film transport pulses accelerate up to the speed of the voltage controlled oscillator, the triggering for the laser 122 is switched from control by the voltage controller oscillator to control by the film transport sprocket pickup 504. In the FIG. 6 apparatus, this switching includes an omission of one trigger pulse in order that the possibility of premature or double triggering of the laser 122 be avoided. Similarly, in switching from triggering controlled by the film transport 500 back to triggering control by components connected to the voltage controlled oscillator 622, as occurs for example, at the termination of a filming sequence, a similar omission of the first trigger pulse is accomplished in the FIG. 6 arrangement of the flip-flops 624 and 626.

The pulse output of the logic gate 638 therefore comprises the selected one of the laser triggering sources and includes the omission of first triggering pulse after commutation between triggering sources. The duration of the pulse emanating from the logic gate 638 is stretched to a predetermined length of about 1 microsecond, suitable for acceptance in the triggering circuit of the laser 122 by the action of the monostable multivibrator 640.

As indicated in the above incorporated-by-reference copending patent applications, the laser 122 is preferably a copper-vapor laser of the Model Number 151, which is manufactured by Plasma Kinetics, Inc. Triggering of this laser is accomplished by a minimum input pulse of 10 volts, and 500 nanoseconds time duration with less than 50 nanoseconds rise and fall times. Signals of this magnitude are provided from the FIG. 6 circuit through the use of an output power field effect transistor 644 which may be embodied, for example, as a VN88 transistor manufactured by Siliconex Corporation. The pulse for triggering the laser 122 is coupled through the jack 646 from the source terminal of the field effect transistor 644. The field effect transistor 344 is thereby operated in a source follower or current amplifying mode. A signal capable of driving the input gate of such a power field effect transistor is provided by the parallel connection of three logic gates 642 which are driven by the output of the monostable multivibrator 640 in FIG. 6.

In the input circuit portion 600 in FIG. 6, the diodes 608 and 610 may be of the 1N4150 commercial type, and the operational amplifiers 612 and 614 of the LF356 type, which are available from National Semiconductor Corp., while the various resistors and capacitors may have the indicated electrical value.

Signal for driving the LED light source 508 in FIG. 5 is provided by the parallel arrangement of three logic gates 648 which are driven from the output of the second comparator circuit 620. The LED light source 508 is energized when the FIG. 6 circuit switches to camera sprocket based laser triggering. The LED pulses indicate the instant of camera based triggering on the exposed film.

In the selecting and driving portion of the FIG. 6 circuitry, the flip-flop multivibrators 624 and 626 may be of the type 4013, manufactured by Motorola, Incorporated. While the inverter stages 632, 634, 636, 642 and 648 may be type 4049 logic gates and the logic gates 628, 630 and 638 may be types 4011 gates manufactured by Motorola, Incorporated. The monostable multivibrator 640 may be a type 4528 also manufactured by Motorola, Incorporated.

The FIG. 5-7 described apparatus has therefore provided an arrangement for triggering the laser in a high-speed laser illuminated photography apparatus, a trigger arrangement which accommodates both the peculiarities of a practical film transport mechanism and the unusual characteristic of a high-energy monochromatic metal vapor laser such as a copper-vapor laser. The described apparatus is embodied using conventional electronic components and includes pulse skipping, frequency hysteresis and other features desirable for use with such lasers.

Propellant Inhibitor

A solid rocket propellant sample has a tendency to burn along all of its flame exposed surfaces and to consequently in the case of the present ¼ inch by ¼ inch propellant sample, form a pointed surface during burning or deflagration. Since a flat planar surface such as the burn face 240 referred to herein, is preferable for photographic study of propellant burn phenomena, some arrangements for confining the sample burn surface to a predetermined sample region and the prevention of "flashing", or burning of a propellant sample along its sides is needed. An inhibitor compound capable of preventing sample side burning or flashing, and providing a burning rate matching the burning rate of the propellant sample is therefore desirable. Such an inhibitor may have use potential in rocket motors employing smokeless propellants, however, its most immediate application is in propellant sample or strand studies within pressure vessels wherein both smoking and flaking of the propellant and the inhibitor are undesirable. In the context of the present apparatus, propellant studies using a sample servo positioner are made feasible with the use of a suitable inhibitor. Optimum performance of an inhibitor is illustrated by contrasting the instance when an inhibitor burns too rapidly and the propellant sample profile is allowed to convert to a conical shape wherein most of the burning surface will be improper for photographic purposes with the situation where the inhibitor burns too slowly and leaves large flakes in its residue. In the latter case, the inhibitor will interfere with servo positioning of the propellant sample and if it generates an excessive quantity of smoke will mask the positioning servo beam and the photographic optics.

A number of inhibitor materials are commonly used in rocket propellant studies. One method of inhibition, for example, involves simply leaching the propellant with water; such leaching, if done immediately preceding deflagration will inhibit burning down the sides of a propellant sample to a relatively high degree. However, if a water inhibitor is applied more than a few minutes prior to deflagration, its inhibiting properties are greatly reduced. Another inhibitor, silicone grease, has been found to not fully prevent the propellant sample sides from burning, and also has been found to release considerable smoke. Yet another inhibitor, sodium silicate, is found to leave an excessive residue, or char, while a number of other available materials, including lacquer and the fluorinated hydrocarbon plastics such as Teflon ®, have also been found unsatisfactory.

Inhibitor performance of a number of commonly used materials is shown in FIG. 3A of the drawings. In FIG. 3A, different inhibitor types are plotted along a vertical axis 300, and the tendency of the inhibitor to char is represented by distances along the left hand extending axis 304, while tendency of the propellant sample to flash in the presence of the inhibitor is plotted along the right-hand extending axis 302. Perfect inhibitor action would therefore appear in FIG. 3A as a graph of zero horizontal length from the vertical axis 300.

The inhibiting properties of an untreated propellant are shown at 306; a lacquer inhibited propellant sample is shown at 308, a Teflon ® inhibited propellant sample at 310, and a silicone grease inhibited sample at 312 in FIG. 3A. Each of these inhibitors is shown to result in significant propellant flashing. The sodium silicate inhibitor represented at 316 in FIG. 3A, on the other hand, results in the presence of excessive char. The phenolic resin represented at 314 in FIG. 3A, however, can be observed to provide near optimum inhibitor performance.

Variations in the concentration of the phenolic resin inhibitor represented at 314 in FIG. 3A are shown in FIG. 3B of the drawings. In FIG. 3B concentrations of phenolic resin varying between 0.32 grams/milliliter and 0.63 grams/milliliter, are represented along the vertical axis 330, while the tendency to flash is represented along the left-extending horizontal axis 334, and the tendency of the inhibitor to flake is represented along the right-hand extending axis 332. As shown for phenolic resin concentration of 0.35 grams/milliliter, near optimum inhibitor performance is possible. The phenolic resin of choice in the FIGS. 3A and 3B representations is a phenol formaldehyde polymer in partially reacted, thermoplastic state. This inhibitor is preferably applied to all surfaces of the propellant sample, excluding the desired burn face and allowed to complete polymerization as a result of the propellant burn heat. Such an inhibitor will prevent deflagration from spreading to the side surfaces of the propellant. By controlling the concentration and thickness of the polymer inhibitor layer, the inhibitor material will burn away at the same rate as the propellant, and no residue or shell formation will result.

The chemical structure of the preferred phenol formaldehyde polymer inhibitor is indicated in FIG. 3C of the drawings. Acetone has been found to be a suitable solvent for this phenol formaldehyde material. Drying times in the order of 6 hours have been found desirable for the described inhibitor. The use of microwave and conventional ovens to reduce this drying time is desirable. The decsribed inhibitor is found most useful at low pressure vessel operating pressures, pressures in the range of 50 to 200 psi, however, formulations for work at higher pressures, 300 to 1000 psi, are possible.

The present invention as described herein provides a system for high-speed, high-resolution photography of combusting surfaces. The described system is immune to flame incandescence effects, film motion blurring, depth-of-field problems, and other difficulties which have hampered prior art combustion study apparatus.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Motion picture photography apparatus for recording burn face phenomena of a rocket propellant sample comprising:
    a pressure vessel having a plurality of optical apertures, a pressure sealable fuel sample aperture and gaseous purge apertures disposed therein;
    a rocket propellant sample partially received via said fuel sample aperture within said pressure vessel;
    a high-speed motion picutre camera having a film transport and an optical system receptive of burn face optical images via said pressure vessel optical apertures;
    pulsed laser monochromatic light source means for illuminating said propellant sample burn face via said optical apertures and in the presence of incandescent propellant combustion gases, optical energy pulses from said laser being of short, motion freezing duration with respect to film motion in said camera film transport and particle motion at said burn face;
    closed-loop sample feeding means connected with a portion of said propellant sample external of said pressure vessel for maintaining said burn face within depth of field focus of said camera optical system during sample burning consumption; and
    synchronizing means responsive to film movement velocity in said film transport for triggering generating of said laser optical output pulses in frame synchronization with said film movement;
    means surrounding said propellant sample in said pressure vessel for limiting propellant burn product action on said apparatus.

2. The apparatus of claim 1 wherein said laser is a metal vapor laser.

3. The apparatus of claim 2 wherein said laser is a copper vapor laser.

4. The apparatus of claim 3 wherein said pressure vessel is cylindrical in shape and wherein a first portion of said optical apertures are orthogonally disposed with respect to a lengthwise central axis of said pressure vessel and another portion of said optical apertures are inclined with respect to said central axis.

5. The apparatus of claim 4 wherein said propellant sample includes a sloping burn face surface disposed orthogonally of said inclined optical apertures and wherein said laser optical energy is communicated with said burn face surface via an optical aperture orthogonally disposed of said pressure vessel lengthwise central axis.

6. The apparatus of claim 5 wherein said closed loop sample feeding means includes a second source of optical energy and optical-to-electrical transducer means illuminated thereby and partially eclipsed by the presence of said propellant sample.

7. The apparatus of claim 6 wherein said second source of optical energy is a gaseous laser.

8. The apparatus of claim 7 wherein said synchronizing means also includes electronic oscillator circuit means for maintaining said laser in self-heating operation prior to and subsequent to a film exposing time interval.

9. The apparatus of claim 8 wherein said sample feeding means includes an electromechanical apparatus connected with the burn face opposite end of said propellant sample.

10. The apparatus of claim 1 further including speckle reducing apparatus located intermediate said laser and said pressure vessel.

11. The apparatus of claim 10 wherein said speckle reducing apparatus includes a diffusion scattering sphere input element that is illuminated by the output optical energy of said laser and located at the object focus of a wide angle ellipsoidal mirror output element.

12. The apparatus of claim 1 wherein said means surrounding said propellant sample includes a flowing atmosphere of predetermined gas.

13. The apparatus of claim 1 wherein said means surrounding said propellant sample includes a coating of inert substance material deposed on the interior surface of said pressure vessel.

14. The method of generating high-speed motion picture images of rocket propellant combustion comprising the steps of:
    disposing a burning propellant test sample in an atmosphere of predetermined pressure, volume and fluid flow;
    illuminating the burning surface of said test sample with pulsed laser optical energy of predetermined spectral content, said optical energy including spectral components segregated from the spectrum of said burning propellant;

imaging said illuminated burning surface onto moving optical film, said laser pulsed energy being of motion freezing short pulse duration with respect to said film moving; and maintaining the receding burning face of the test sample in predetermined image focused physical position by feeding said sample forward in response to burning progression.

15. The method of claim 14 wherein said imaging step includes optical filtering of said imaging energy, said filtering attenuating said burning propellant spectral frequencies and transmitting said laser spectral frequencies.

16. The method of claim 15 further including the step of imaging a marker reference optical signal onto said moving optical film.

17. The method of claim 15 wherein said illuminating step includes generating said laser optical energy with a copper vapor laser.

18. The method of claim 17 further including the step of maintaining said copper vapor laser in self-heating elevated temperature sustaining operation prior to and subsequent to said illuminating step.

19. The method of claim 14 further including the step of coating the side lateral surfaces of said propellant test sample with a burn inhibitor material capable of limiting propellant burning to an endwise disposed surface thereof.

* * * * *

UNITED STATES PATENT AND TRADEMARK OFFICE
CERTIFICATE OF CORRECTION

PATENT NO. : 4,744,650

DATED : May 17, 1988

INVENTOR(S) : Roger J. Becker et al

It is certified that error appears in the above-identified patent and that said Letters Patent is hereby corrected as shown below:

In the Abstract, line 8, change "coherance" to --coherence--.

Col 1, after line 15, containing the word "with", insert

--<u>RIGHTS OF THE GOVERNMENT</u>

The invention described herein may be manufactured and used by or for the Government of the United States for all governmental purposes without the payment of any royalty.--

Col 2, line 11, change "satisfactory" to --satisfactorily--.

Col 4, line 40, change "drawings drawings" to
--drawings-drawings--.

Col 5, line 58, change "fields," to --fields.--.

UNITED STATES PATENT AND TRADEMARK OFFICE
CERTIFICATE OF CORRECTION

PATENT NO. : 4,744,650

DATED : May 17, 1988

INVENTOR(S) : Roger J. Becker et al

It is certified that error appears in the above-identified patent and that said Letters Patent is hereby corrected as shown below:

Col 8, line 26, delete "represented".

Col 8, line 28, delete "Fig. 2 illus-".

Col 8, line 29, delete "trated pressure".

Col 8, line 52, change "highreflectivity" to --high-reflectivity--.

Col 12, line 47, change "being" to --begin--.

Col 15, Claim 1, line 55, change "picutre" to --picture--.

Signed and Sealed this

Second Day of January, 1990

*Attest:*

JEFFREY M. SAMUELS

*Attesting Officer*     *Acting Commissioner of Patents and Trademarks*